United States Patent
Gurin (10) Patent No.: US 9,634,596 B2
(45) Date of Patent: Apr. 25, 2017

(54) HYBRID POWER GENERATION WITH VARIABLE VOLTAGE FLUX

(71) Applicant: Michael H Gurin, Glenview, IL (US)

(72) Inventor: Michael H Gurin, Glenview, IL (US)

( * ) Notice: Subject to any disclaimer, the term of this patent is extended or adjusted under 35 U.S.C. 154(b) by 818 days.

(21) Appl. No.: 14/049,972

(22) Filed: Oct. 9, 2013

(65) Prior Publication Data

US 2015/0097432 A1    Apr. 9, 2015

(51) Int. Cl.
  *H02J 3/14*   (2006.01)
  *H02P 9/00*   (2006.01)
  *H02J 4/00*   (2006.01)
  *B60L 11/12*   (2006.01)
  *B60W 10/08*   (2006.01)
  *B60L 11/00*   (2006.01)

(52) U.S. Cl.
  CPC ............ *H02P 9/008* (2013.01); *B60L 11/00* (2013.01); *B60L 11/126* (2013.01); *B60W 10/08* (2013.01); *H02J 4/00* (2013.01); *Y10T 307/406* (2015.04)

(58) Field of Classification Search
  CPC ........... H02J 4/00; B60L 11/00; B60L 11/126; B60W 10/08

USPC ................... 324/207.16, 252; 320/108, 116; 180/53.6, 53.1; 701/22
See application file for complete search history.

(56) References Cited

U.S. PATENT DOCUMENTS

| | | | | | |
|---|---|---|---|---|---|
| 4,780,619 | A | * | 10/1988 | Campbell | H02J 7/1438 307/10.1 |
| 6,114,775 | A | * | 9/2000 | Chung | B60K 6/46 180/65.245 |
| 2006/0214644 | A1 | * | 9/2006 | Okahara | H02P 9/006 322/23 |

* cited by examiner

*Primary Examiner* — Arnold Kinkead (57) ABSTRACT

The present invention generally relates to power production and energy storage methods requiring high efficiency, particularly relating to a power generator and transmission system utilizing a variable voltage flux actuator that varies the output voltage with substantially lower speed interdependency in addition to varying the power output within a range of speed operation particularly for direct current power consumers. The power generator system is then connected to a set of voltage regulators, with the entire system organized for maximized conversion efficiency.

21 Claims, 9 Drawing Sheets

FIG. 1

Scenario A
Electrical Generator Voltage > HVB Voltage

Scenario B
HVB Voltage > Electrical Generator Voltage > LVB Voltage

FIG. 2

Scenario C
Electrical Generator Voltage < LVB Voltage

Scenario D
Electrical Generator Voltage = LVB Voltage

Scenario E
Electrical Generator Voltage = HVB Voltage

HYBRID POWER GENERATION WITH VARIABLE VOLTAGE FLUX

FIELD OF THE INVENTION

The present invention generally relates to power generators, in which electricity is produced for energy consumers operating on direct current (as opposed to alternating current at a specified frequency e.g., 50/60 Hz). In the embodiments, the present invention utilizes a variable voltage flux actuator to vary the output voltage of the electrical generator with the objective of maximizing total energy to electricity conversion efficiency including conversion devices yielding the appropriate voltage to the energy consumers.

CROSS-REFERENCE TO RELATED APPLICATIONS

This application does not claim any priority from prior patent applications.

BACKGROUND OF THE INVENTION

In an age of global warming and rising energy costs, more efficient power generation and transmission methods must be developed to reduce carbon dioxide emissions from electricity production and to reduce the amount of energy wasted in the process. Furthermore, the growing use of hybrid and all-electric vehicles necessitates the development of generators—not just batteries—capable of integration with these devices.

Increasing numbers of electricity-consuming devices either operate on direct current or consume alternating current at a varying frequency (e.g., through the use of a variable speed/frequency drive). The most modern high efficiency devices are dominated by having direct current, as opposed to alternating current, consumption to a larger degree. Data centers, computers, televisions, LED lighting, DC brushless motors, etc. are all devices that consume direct current and thus have very little use for alternating current (at least within the global utility standards of 50/60 Hz) electronic ballasts. Additional devices, particularly in larger scale commercial and industrial operations often utilize variable frequency/speed drives which currently utilize alternating current (typically within 50/60 Hz) only to then convert the power into direct current and then to a higher frequency alternating current. The ability to provide direct current has the potential to decrease conversion losses, and utilize the inherent voltage regulators often built into the variable frequency drives to further accept a direct current power source that has a varying voltage output. Additional devices such as solid state ballasts for fluorescent lighting is another such example.

SUMMARY OF THE INVENTION

The present invention preferred embodiment relates to an energy production process utilizing a variable voltage flux actuator that varies the output voltage of the electrical generator based on demand in order to maximize the total energy to electricity conversion efficiency. The preferred embodiment further includes at least one energy storage module to help maintain the actual speed of the generator within the operable range and to store electrical energy for later use.

DETAILED DESCRIPTION OF THE PREFERRED EMBODIMENTS OF THE INVENTION

The term "in electrical communication with", as used herein, refers to the direct connection between an electrical source and an electrical consumer.

The terms "speed regulator" and "fuel regulator", as used herein, are used interchangeably. It should be noted that a speed regulator may contain additional features such as monitoring and controlling, but the primary method of controlling the speed of an engine is typically through control of fuel mass flow rate. It is understood that the collective speed regulator and fuel regulator controls the net power output at least partially as a function of speed.

The term "voltage regulator", as used herein, is known in the art as a DC-DC converter than can be arranged in a buck, boost, or buck/boost configuration. In a buck configuration, the converter steps down the voltage, whereas in a boost configuration, the voltage is stepped up. A buck/boost configuration simply means the converter is capable of either, though such converters are typically less efficient. "Voltage regulator" is used interchangeably with "voltage converter". It is understood, though not preferred, that a variable voltage transformer could also be utilized to vary the power generator output voltage while at the high frequency alternating current prior to the rectifier and prior to the DC-DC converter.

The terms "actual percent of capacity (APOC)" and "actual stored energy level", as used herein, are interchangeable and refer to the amount of energy stored in the energy storage module 35.

The term "energy storage module", as used herein, is used interchangeably with "battery". It is further recognized that the energy storage module includes capacitors, supercapacitors, ultracapacitors, flywheels, and flow batteries.

The term "power generator system", as used herein, refers to the mechanical converter 38, the electrical generator 1, the shaft connecting the generator 1 and mechanical converter 38, the flywheel 42, the engine management controller 39, the variable voltage flux actuator 40, and the fuel regulator 41 collectively.

The term "power transmission system", as used herein, refers the high voltage DC converter with buck capability 2, the low voltage DC converter with buck capability 4, the low voltage DC converter with boost capability 5, the high voltage bus 3, the low voltage bus 6, the high voltage consumers 8, the low voltage consumers 9, and energy storage 7 collectively. Thus the term refers to everything outside the power generator system other than the vacuum pump 43 and vacuum buffer tank 45.

Terms:
  PER=projected energy requirement
  APOC=actual percentage of capacity
  UOL=upper operating limit
  LOL=lower operating limit
  HVB=high voltage bus
  LVB=low voltage bus
  $HVB_V$=HVB.sub.V=high voltage bus voltage
  DCBB=DC converter with buck and boost capabilities
  LDCBU=low voltage DC converter with buck capability
  LDCBO=low voltage DC converter with boost capability
  HDCBU=high voltage DC converter with buck capability Here, as well as elsewhere in the specifications and claims, individual numerical values and/or individual range limits can be combined to form non-disclosed ranges.

Although the invention has been described in detail with particular reference to certain embodiments detailed herein, other embodiments can achieve the same result. Variations and modifications of the present invention will be obvious to those skilled in the art and the present invention is intended to cover in the appended claims all such modifications and equivalents.

It is understood that modulating a magnetic field induces a voltage, such that anything known in the art to modulate the magnetic field will change the induced voltage. In this invention, the term magnetic flux and magnetic field are interchangeable and thus modulating flux can also modulate voltage and/or current as known in the art.

Figure 1:
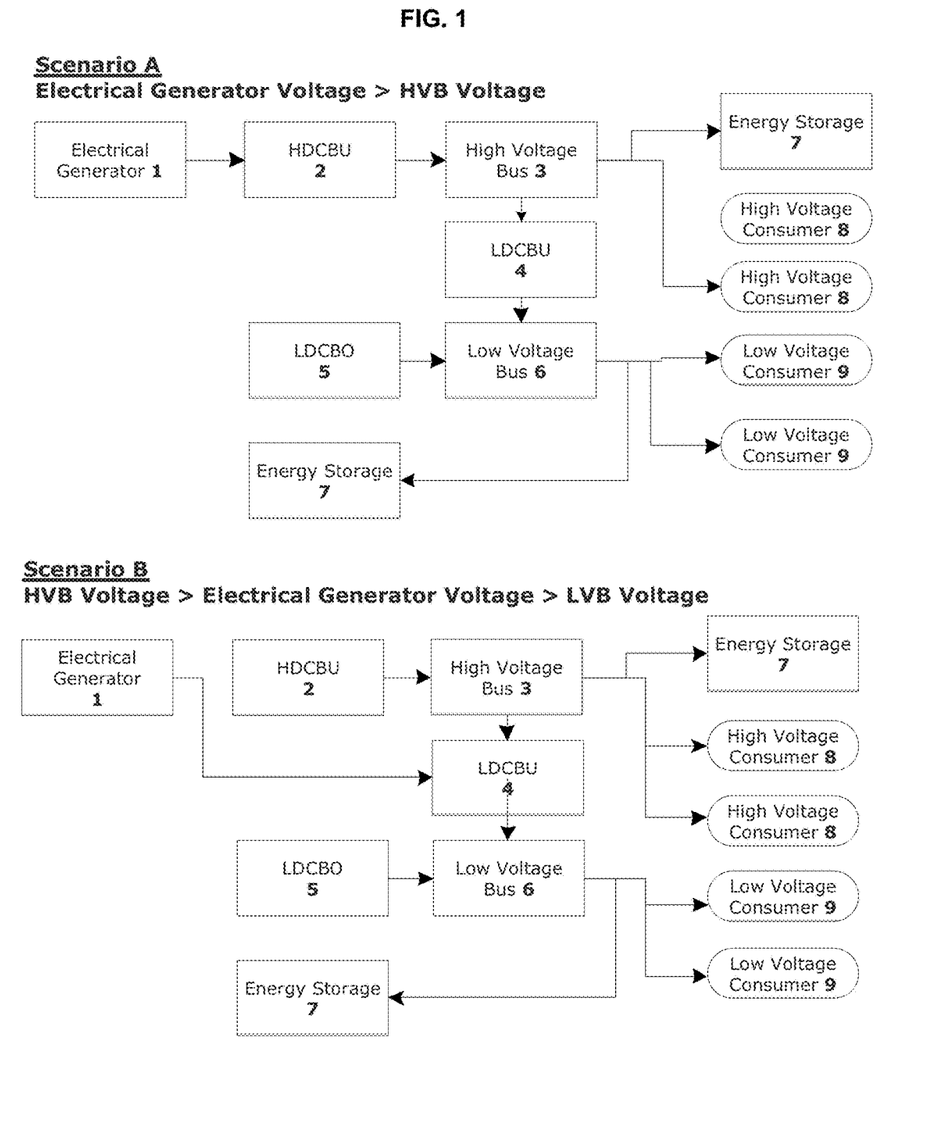
FIG. 1 is a schematic of two scenarios of the electric current through the power generator and transmission system in accordance with the present invention.
Figure 2:
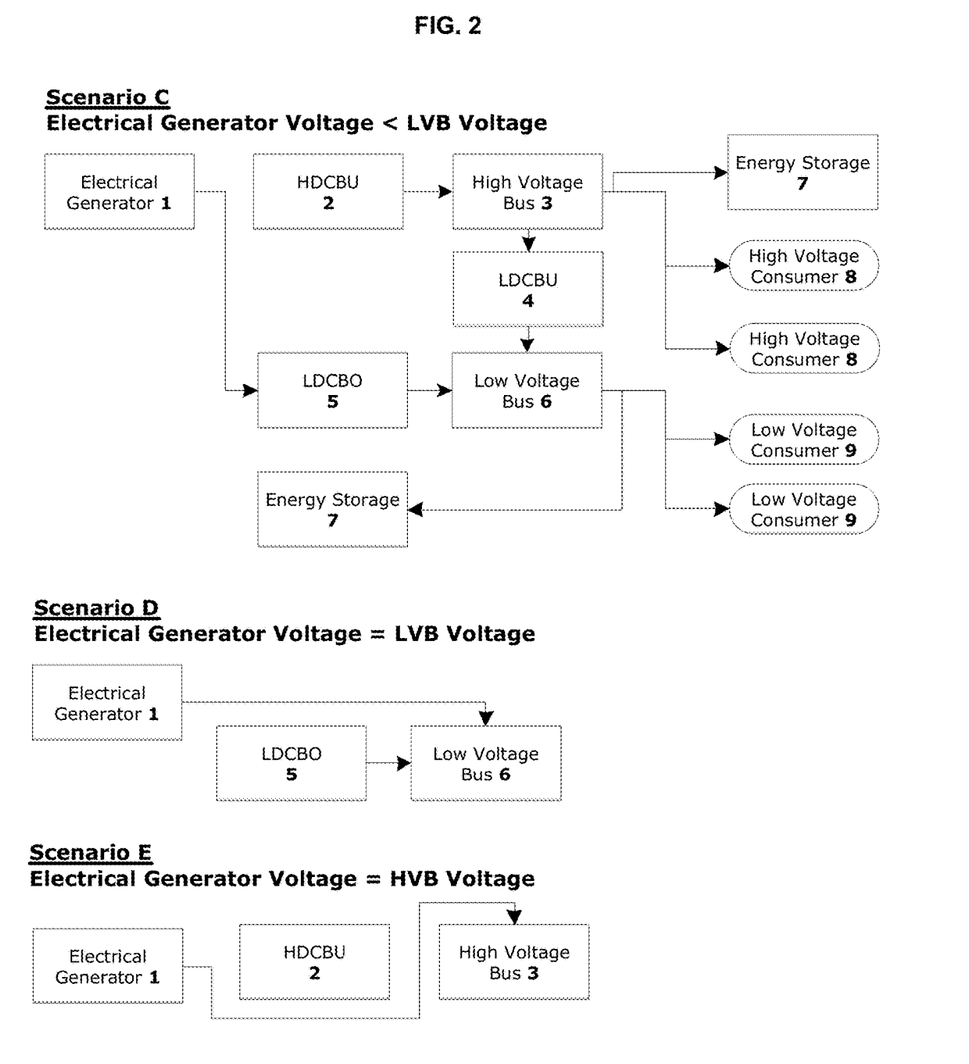
FIG. 2 is a schematic of three further scenarios of the electric current through the power generator and transmission system in accordance with the present invention.

FIGS. 1 and 2 illustrate the overall schematic of the power generator and transmission system. Electricity from the electrical generator 1 flows either directly to the high voltage bus 3 or low voltage bus 6, or it flows through one of the three voltage regulators to the high voltage bus 3 or low voltage bus 6. The three regulators are the high voltage DC converter with buck capability, HDCBU 2; the low voltage DC converter with buck capability, LDCBU 4; and the low voltage DC converter with boost capability, LDCBO 5. The high voltage bus 3 is in electrical communication with the high voltage consumers 8, who may draw electricity; one of the two low voltage regulators, the LDCBU 4; and possibly energy storage 7. The invention anticipates energy storage 7 on the low voltage circuit 6 (preferred), on the high voltage circuit 3, or on both. Electricity flowing through the LDCBU 4 or the LDCBO 5 reaches the low voltage bus 6, from which it may be utilized by low voltage consumers 9 or stored in energy storage 7 via the charger circuit. Each of these components is described in detail below. Various controllers manipulate the different parts of the power generator and transmission system according to FIG. 9.

Figure 8:
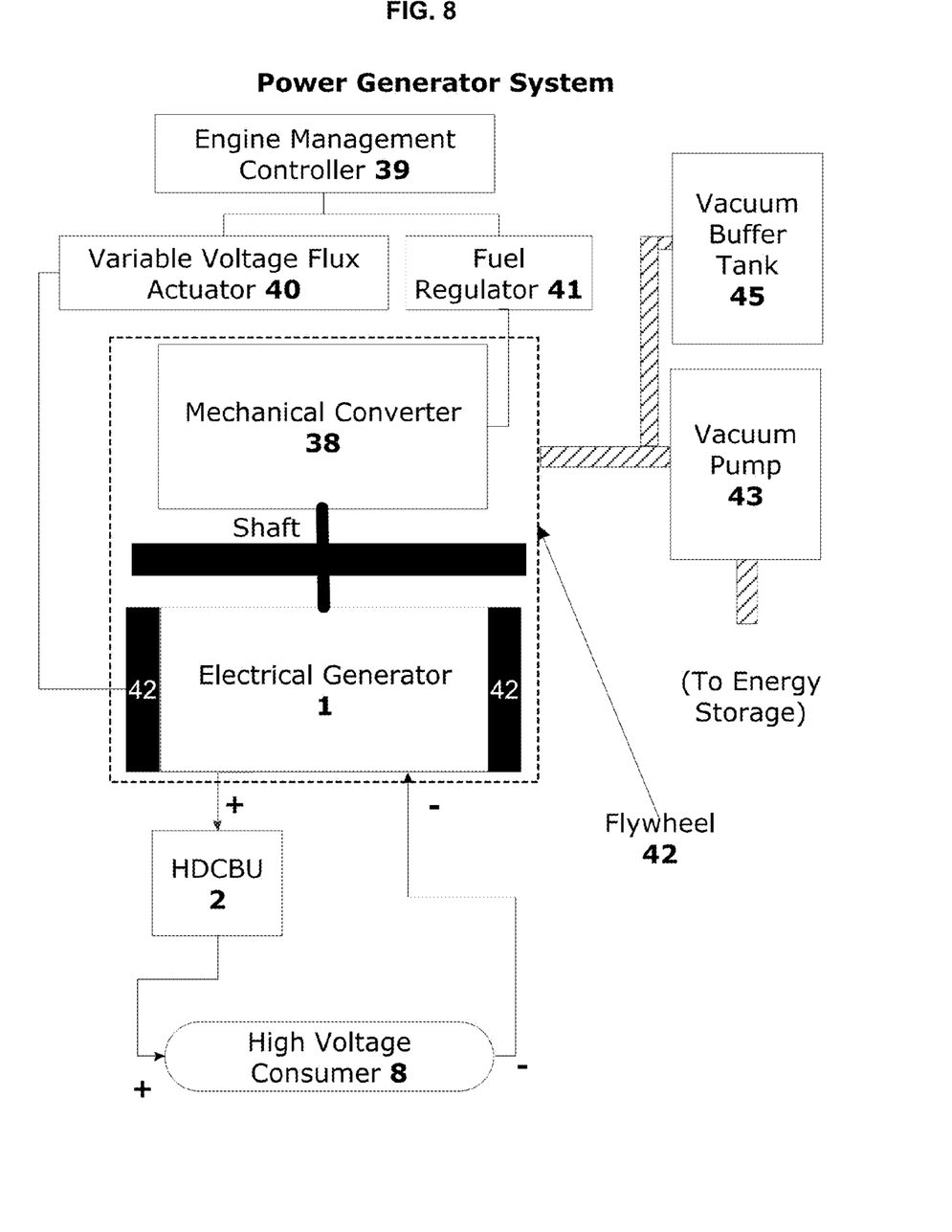
FIG. 8 is a schematic showing how the mechanical converter and electrical generator are connected to the rest of the power generator system in accordance with the present invention.

In the power generator system, as illustrated in FIG. 8, a mechanical converter 38 is connected by a shaft to the electrical generator 1 to convert the kinetic energy of the generator 1 to electricity. It is understood within this invention that the mechanical power converter 38 can be any known in the art engine, including piston-based internal combustion engines. The preferred embodiment is that the mechanical power converter 38 is a turbine including known in the art turboexpanders, such as our particularly preferred ramjet expander, which favor steady-state operation within a minimum and maximum operating speed range (or at least minimal start-stop cycling) and/or within a minimum and maximum power rating range. It is understood that turboexpanders are interchangeable with turbines, expansion devices for extracting energy, etc. Steady-state operation maximizes the operating lifetime, i.e. the time between maintenance, as well as system efficiency.

An engine management controller 39 varies the generator 1 voltage using a variable voltage flux actuator 40 in order to adjust the actual electricity production rate of the electrical generator 1. The engine management controller 39 can also change the actual electricity production rate by varying the speed of the mechanical converter 38 via the fuel regulator 41, but this is less desirable than adjusting the voltage since ideally the converter speed will be maintained at or near an optimal speed operating rating between its minimum and maximum speed operating ratings. This optimal speed operating rating is a nonlinear function of the actual operating speed and has a global maximum efficiency point. The preferred method of operation utilizes the nonlinear function of the actual operating speed that is further a function of the actual power production rate. Thus the specifically preferred operation selects the optimal speed for every actual power production rate and varies the voltage output conditions using the variable voltage flux actuator 40 accordingly. The preferred operating speed is within five percent of the optimal speed rating, the particularly preferred operating speed is within three percent of the optimal speed rating, and the specifically preferred operating speed is within one percent of the optimal speed rating. Furthermore, the electrical generator 1 can operate as an electric motor to rotate the mechanical converter 38 when the actual electricity production is insufficient to maintain the speed at least approximately one percent less than the minimum operating speed.

The power generator system also contains at least one integral flywheel 42, connected to either the electrical generator 1 itself or to the shaft connecting the generator 1 to the mechanical converter 38, to store kinetic energy and maintain the speed of the mechanical converter 38 above the minimum speed operating rating by at least approximately one percent. The flywheel 42 also extends the mechanical converter operating time within the speed operating range, without additional fuel, by approximately at least five seconds (as opposed to without the flywheel 42), as its inertia reduces the rate of deceleration towards the minimum operating speed. A vacuum pump 43 is connected to the power generator system to create vacuum conditions for the generator 1 when operating as a motor or flywheel such as to reduce windage losses. The vacuum "region" will encompass at least the variable voltage flux actuator 40, the connecting shaft, and the electrical generator 1 in such a situation. The more preferred vacuum region will encompass the variable voltage flux actuator 40, the fuel regulator 41, the mechanical converter 38, the connecting shaft, the integral flywheel 42, and the electrical generator 1 in such a situation. A vacuum buffer tank 45 reduces the necessary size of the vacuum pump 43 and helps reduce the time necessary to reach vacuum conditions, again reducing windage losses. The specifically preferred utilization of the vacuum pump 43 utilizes the mechanical converter 38, notably the compressor portion of the mechanical converter 38 with a valve to shutoff the flow of incoming combustion air into the mechanical converter 38. This resulting embodiment enables the compressor portion to effectively operate as a vacuum pump/compressor, potentially eliminating the requirement for a separate vacuum pump 43. It is understood that the vacuum pump 43 is interchangeable with a vacuum compressor and thus is independent of whether it is a piezoelectric, piston, axial, or radial type of device.

It is further understood that the preferred embodiment is void of a variable reducing/increasing ratio gearbox. It is also further understood that the variable voltage flux actuator 40 has a hanging gap between the stator and rotor, such that the gap distance determines the magnetic flux and thus the voltage within the electrical generator 1. Another method as known in the art to alter the voltage is by changing the magnetic field orientation between the stator and rotor within the electrical generator 1.

The preferred embodiment of this power generator system lacks a variable reducing/increasing ratio gearbox, for the high speeds of the electrical generator 1 (approximately 200,000 rpm) make such a system impractical, though it would allow the generator 1 and converter 38 to operate at different speeds. In this design the generator 1 and converter 38 are on the same shaft, so adjusting the voltage or the speed is necessary to change the actual electricity production rate. It is anticipated in this invention that the variable voltage flux actuator 40 can be used with a variable reducing/increasing ratio gearbox as known in the art, notably when the operating speed of the electrical generator 1 is within industry standards.

The electrical generator 1 has maximum and minimum voltage operating ratings, and the engine management controller 39 and the variable voltage flux actuator 40 work to maintain the actual operating voltage between these limits. These two components act to (a) reduce the actual operating voltage when it exceeds the high voltage setpoint (the desired voltage of the high voltage bus 3, with one exemplar voltage of 380 VDC) by at least one percent, (b) reduce the actual operating voltage when it exceeds the low voltage setpoint (the desired voltage of the low voltage bus 6, presumably another examplar voltage of 48 VDC or 24 VDC) by at least one percent while the voltage switch is connected to the low voltage regulator 4 or to at least one low voltage consumer 9, (c) increase the actual operating voltage when it is below the low voltage setpoint by at least one percent while the voltage switch is connected to a low voltage regulator 5 or to at least one low voltage consumer 9, and (d) increase the actual operating voltage when it is below the high voltage setpoint by at least one percent while the voltage switch is connected to the high voltage regulator 2 or to at least one high voltage consumer 8. Accordingly, the electrical generator 1 strives to output an actual voltage approximately equal to the high voltage setpoint or the low voltage setpoint when connected to the high voltage regulator 2 or one of the two low voltage regulators, respectively. It is preferred that the actual voltage is within ten percent of the voltage setpoint, particularly preferred that the actual voltage is within five percent of the voltage setpoint, and specifically preferred that the actual voltage is within one percent of the voltage setpoint in order to maximize electricity direct current conversion efficiency. The individual consumers for the high voltage bus 3 and the low voltage bus 6, respectively the high voltage consumer 8 and the low voltage consumer 9, typically have input voltage specifications, which is required to be maintained at all times. The voltage provided to each bus (i.e., low voltage bus 6 or high voltage bus 3) has to remain approximately at least 1 percent greater than the lowest input voltage specification of the consumers. It is anticipated that this minimum threshold voltage will vary in accordance to the real-time demand of the connected consumers of electricity.

The engine management controller 39 can switch electricity supply between the high voltage bus 3 and the low voltage bus 6, going through the respective high voltage regulator 2 or low voltage regulator 5. Switching to the low voltage bus 6 is preferably done when the electrical demand is not sufficient from the high voltage consumers 8, in which case the energy storage module 35 is connected to a charger circuit to increase demand. Of course, the energy storage module 35 must have had an actual stored energy level less than its energy storage capacity and must not have already been connected to the charger circuit. The increased demand for electricity has the intended consequence of raising the operating speed of the electrical generator 1 so as to ensure the actual operating speed is above the minimum operating speed rating.

The electrical generator 1 also has a maximum current operating rating, above which the electric current may damage equipment; there is typically no current minimum from a safety perspective (though of course conversion efficiency is typically lower at currents below the current rating of the conversion equipment), though zero current would mean that no power is being produced. The engine management controller 39 and the variable voltage flux actuator 40 act to reduce the actual operating current if it ever exceeds the maximum current operating rating by more than one percent while the voltage switch is connected to the HDCBU 2 or to at least one high voltage consumer 8. During this process the fuel regulator 41 maintains the actual mechanical converter speed within the minimum and maximum speed operating ratings. If the maximum current operating rating is approached while the energy storage module 35 is connected to the charger circuit, the module 35 will be disconnected to reduce load. Also, if the electrical generator 1 is connected to the low voltage bus 6 and the maximum current operating rating is approached, the connection will be switched to the high voltage bus 3 using the voltage switch.

It is known in the art of ramjets in particular that the operating efficiency, notably of the compressor, is a function of operating speed. Therefore, it is further desired that when the mechanical converter is 38 is a ramjet engine that the effective operating speed within the ramjet compressor reach a minimum speed of Mach 1.8. The more preferred minimum speed of the ramjet is greater than Mach 2.0, and the specifically preferred minimum speed of the ramjet is greater than Mach 2.5. Turbines in general reduced engine efficiency at reduced speeds, thus the ability to effectively achieve speed control relatively independently (or at least less dependent to speed than traditional permanent magnet motors) of voltage is a unique advantage of the embodiments.

The maximum power production rating of the electrical generator 1, as known in the art, is determined by the product of the maximum voltage operating rating and the maximum current operating rating with power factor correction included. Operation of the electrical generator 1 at or below the maximum power production rating is intended to prolong the lifespan of the electrical generator 1 as well as maintain safe operating conditions.

The output voltage of the electrical generator 1 varies by at least approximately five percent of the maximum voltage rating before being rectified and then regulated by the voltage regulators. The HDCBU 2 would handle a preferred voltage range of 100 VDC to 600 VDC, a particularly preferred voltage range of 240 VDC to 600 VDC, and a specifically preferred voltage range of 380 VDC to 600 VDC. These ranges allow for international use within industrial, commercial and residential use environments; they also have a direct current voltage output greater than 100 volts, in the 300- to 600-volt range, which allows for voltage fluctuations within tolerance in the United States. Likewise, the LDCBU 4 has a preferred voltage range of 48 VDC to 100 VDC, a particularly preferred voltage range of 48 VDC to 240 VDC, and a specifically preferred voltage range of 48 VDC to 380 VDC. Lastly, the LDCBO 5 has a preferred voltage range of 8 VDC to 48 VDC, a particularly preferred range of 10 VDC to 48 VDC, and a specifically preferred range of 12 VDC to 48 VDC. Both low voltage converters have a direct current output less than 60 volts, which enables the use of class II wiring as per US building codes, and more specifically an output less than 48 volts.

These regulators adjust the voltage to a specified direct current voltage before the electricity is provided to either the direct current high voltage bus 3 or the direct current low voltage bus 6. The specified direct current voltage is lower than the maximum voltage rating by at least approximately five percent, and the electricity provided to the busways (the industry term "bus" is actually an abbreviated version of "busway") within at least approximately five percent of the bus voltage setpoint. The actual bus operating voltage is the voltage of the bus at any given time and may differ from the voltage setpoint. The electricity direct current conversion efficiency is maximized as the direct current voltage provided to the bus approaches the bus voltage setpoint. This implies that if the electrical generator 1 output voltage is approximately equal to the bus voltage setpoint, the DC-DC converters can be bypassed, maximizing efficiency. Therefore, the voltage provided to the bus is preferred to be within five percent of the setpoint, particularly preferred to be within three percent of the setpoint, and specifically preferred to be within one percent of the setpoint. The fuel regulator 41 maintains the actual mechanical converter speed such as to maximize mechanical converter efficiency, and this combined with the maximized electricity direct current conversion efficiency allows the net energy efficiency to be maximized. Specifically preferred is operating the actual voltage output from the electrical generator 1 at a voltage that minimizes conversion efficiency losses and thus operates at a voltage that bypasses any unnecessary voltage regulators in order to maintain the input voltage requirement threshold of the connected and powered consumers.

Figure 6:
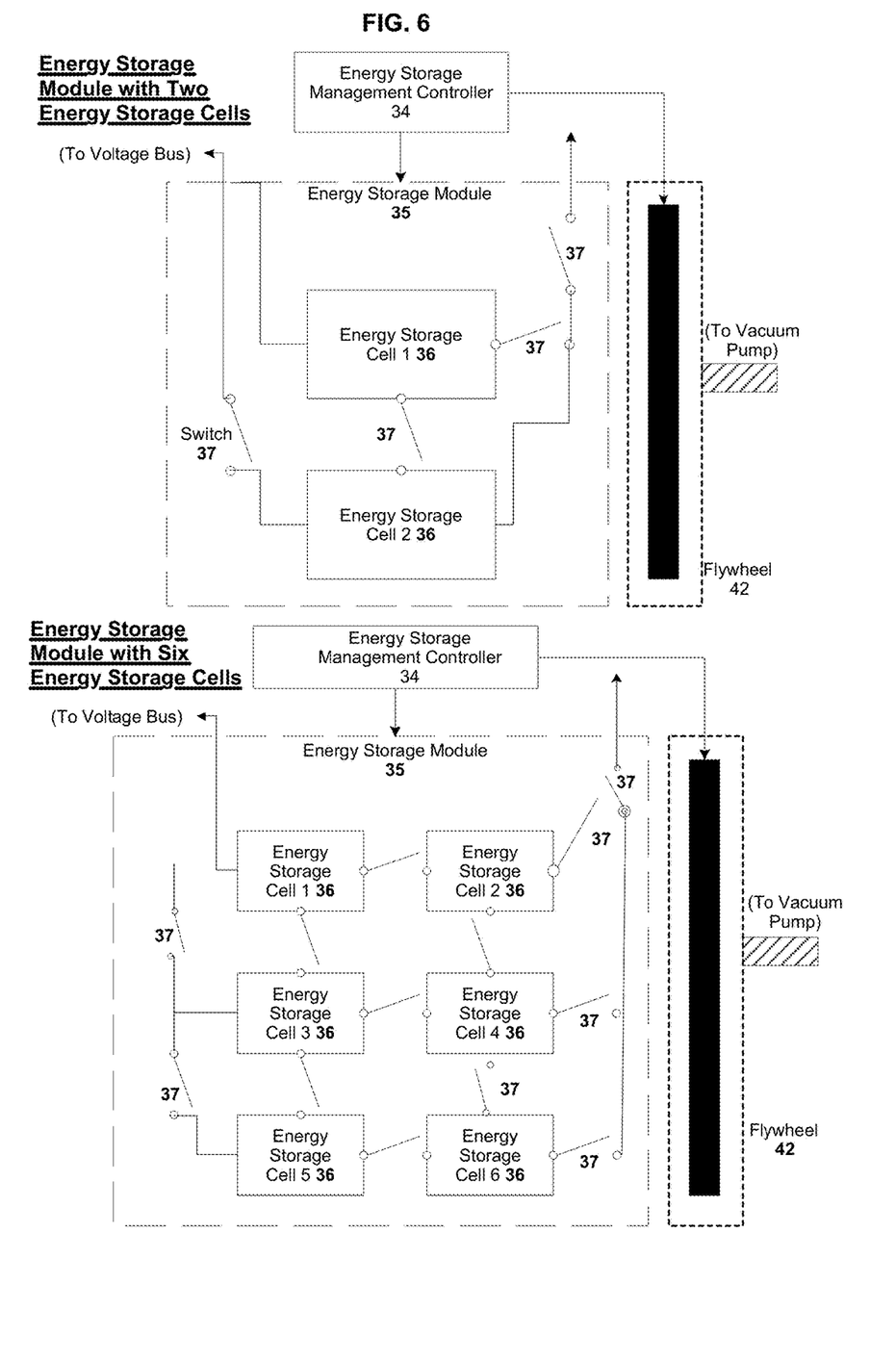
FIG. 6 is a schematic of two possible layouts of the charger circuit and energy storage module, with the difference being in the number of energy storage cells in the energy storage module, in accordance with the present invention.

An energy management controller 44 can also activate a charger circuit, detailed in FIG. 6, connected to an energy storage module 35 which consists of two or more energy storage cells 36, one or more switch 37, an energy storage management controller 34, and at least one flywheel 42 under vacuum conditions (generated by the vacuum pump 43). This switch or switches 37, controlled by the energy storage management controller 34, allows the configuration of the energy storage cells 36 to be varied, allowing subsets to be made into strings of series, parallel, or combined arrangements. The energy storage module 35 has an actual operating voltage and actual operating current while charging, both of which are controlled by the energy storage management controller 34. The variable arrangement allows the actual operating voltage of the energy storage cells 36 to be within at least approximately five percent of the actual electrical generator 1 operating voltage, and the module 35 has a maximum operating current of at least twenty percent greater than that of the electrical generator 1. While charging, the engine management controller 39 varies the actual speed of the generator 1 to at least within five percent of the optimal operating speed via the fuel regulator 41, maintains an actual mechanical converter 38 speed between the minimum and maximum speed operating ratings, and maintains an actual current of at least approximately one percent less than the maximum current rating.

Each energy storage cell 36 has an optimal voltage in addition to its actual operating voltage, and the energy storage module 35 as a whole also has an optimal voltage. The variable voltage flux actuator 40 of the power generator system is operable to match at least within approximately five percent of the optimal voltage of the energy storage module 35. The energy storage module 35 also has a charge voltage and a discharge voltage, and it is operable with a variance of at least approximately ten percent between the two. The particularly preferred embodiment includes and anticipates devices known in the art that smooth the direct current output, specifically such that the power output from the electrical generator 1 is stable. Notably, a wide range of devices "chop" the direct current output into time slices to achieve dimming of LEDs or varying the speed of DC brushless motors. Smoothing of power currents includes devices such as smoothing reactor, turbine inertia, flywheel inertia, inductor, capacitors (such as ultra-, supercapacitors) capable of current ripples of frequency greater than 1 kHz. The vacuum conditions for the energy storage flywheel or flywheels 42 are maintained by the vacuum pump 43 of the power generator system, which is preferably powered by electricity from the energy storage module 35, though electricity from the utility grid is also anticipated to yield approximately equivalent results. The vacuum pump 43 is operated during regenerative braking when the system is installed in a hybrid vehicle (which is expanded upon later). By operating the vacuum pump 43 during regenerative braking, capturing the regenerated energy is maximized. While braking, the mechanical power converter 38 of the power generator system is run at higher speeds so that the electrical generator 1 effectively operates as a flywheel, harvesting the current inrush to increase fuel efficiency by conversion into mechanical energy inertia within the flywheel. The preferred embodiment has the electrical generator 1 speed increasing up to approximately the maximum design speed to maximize the conversion of regenerative braking energy into mechanical inertia.

Connecting the charger circuit has the intended effect of increasing the actual electricity production rate and maintaining the speed of the mechanical converter 38 by at least approximately one percent above the minimum speed operating rating. While the energy storage cells 36 are charging, i.e. while the energy storage module 35 is connected to the charger circuit, the energy management controller 44 controls the fuel regulator 41 in order to maintain the actual mechanical converter speed between the minimum and maximum speed operating ratings. The fuel regulator 41 also ensures that the actual current remains less than the maximum current rating by at least one percent.

The energy storage 7 system also contains an anti-cycling timer by utilizing a next time cycle off parameter. With logic illustrated in FIG. 5, the energy management controller 44 calculates the projected power consumption within the next time cycle off allowed parameter in addition to calculating the operating time requirement to charge the energy storage module 35 to an actual stored energy level exceeding the projected power consumption. The variable voltage flux actuator 40 and the fuel regulator 41 then vary the actual electricity production rate to operate at the global maximum efficiency point for the calculated operating time requirement.

Figure 5:
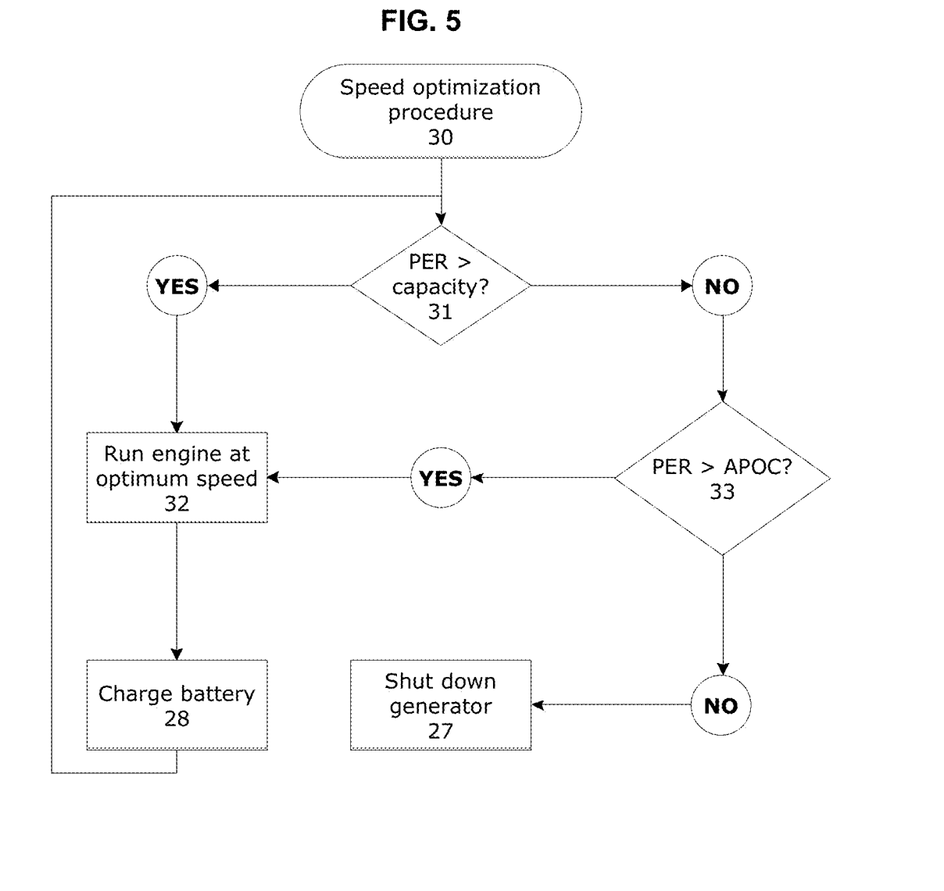
FIG. 5 is a logic flow chart of the electrical generator speed optimization procedure in accordance with the present invention.

When the power generator and transmission system is utilized in a hybrid vehicle, the energy management controller 44 uses the current location and current destination in combination with anticipated energy recovery levels from regenerative braking (i.e., calculated through historic mass data and current hybrid vehicle speed) to limit the actual stored energy level and enable a full recovery of energy from regenerative braking into charging of the energy storage module 35, again as in FIG. 5. This means that the energy management controller 44 can disconnect the energy storage module 35 from the charger circuit (i.e., limit fuel consumption of power generator) in order to charge it using the "fuel-free" vehicle's inertia as converted by regenerative braking. The energy management controller 44 can also utilize the current location and destination to calculate the actual stored energy level required to reach the destination without a deep discharge cycle of the energy storage module 35 to initiate an orderly shutdown of the electrical generator 1.

High voltage consumers 8 such as motors or fans typically draw power from the high voltage bus 3, and low voltage consumers 9 such as LED lights advantageously draw electricity from the low voltage bus 6 so as to utilize Class II wiring as known in the art. Five scenarios of the connections of the entire power generator and transmission system are outlined below, detailed in FIGS. 1 and 2:

Turning to FIG. 1, FIG. 1 Scenario A depicts the power generator and transmission system's arrangement when the electrical generator 1 voltage is greater than that of the high voltage bus 3, which is most likely when the current is approaching the upper operating limit; this requires the voltage to be increased with the intended effect of reducing the current for a given power output. In this case the electrical generator 1 is in electrical communication with the HDCBU 2. The purpose of the DC-DC converter is to regulate the voltage of the high voltage bus 3. The HDCBU 2 steps the voltage of the electrical generator 1 down to that of the high voltage bus 3. (We anticipate, however, the HDCBU 2 may also have boost capability, in which case it could also boost the voltage from the electrical generator 1 up to the high voltage bus 3, if necessary, and reduce the number of voltage regulators in the system to two.)

On the high voltage bus 3 at least one high voltage consumer 8 draws electricity from either the electrical generator 1 or energy stored in the energy storage module 35. It is understood that excess electricity produced by the electrical generator 1 can be stored in the energy storage module 35. The high voltage bus 3 is also in electrical communication with the LDCBU 4, which bucks the voltage down to that of the low voltage bus 6, from which low voltage consumers 9 can draw current/power. Excess electricity on the low voltage bus 6 can also be stored in energy storage 7 for later use.

Turning again to FIG. 1, FIG. 1 Scenario B depicts the power generator and transmission system's arrangement when the voltage of the electrical generator 1 is less than that of the high voltage bus 3 but greater than that of the low voltage bus 6, a situation likely when electricity demand is low. The LDCBU 4 will communicate directly with the electrical generator 1 and will buck the voltage to that of the low voltage bus 6, from which at least one low voltage consumer 9 may draw power or from which energy may be stored in energy storage 7 for future use. However, if a low voltage DC converter with buck/boost capability is used, the voltage could also be boosted to that of the high voltage bus 3. Such a converter would again allow the system to operate with only two voltage regulators, so the following Scenario C would use the same regulator as Scenario B.

Turning to FIG. 2, FIG. 2 Scenario C illustrates the connections when the voltage of the electrical generator 1 is less than the voltage of the low voltage bus 6, which is most likely when the demand is very low or the energy storage module 35 is connected to the charger circuit. The electrical generator 1 will be in electrical communication with the LDCBO 5, which boosts the voltage up to that of the low voltage bus 6, again from which electricity can be utilized by low voltage consumers 9 or stored in energy storage 7 for future use.

Remaining on FIG. 2, FIG. 2 Scenario D shows the case when the electrical generator 1 voltage is equal to that of the low voltage bus 6: the electrical generator 1 will communicate directly with the low voltage bus 6 and circumvent the LDCBU 4 and the LDCBO 5 entirely, minimizing electricity direct current conversion losses. Low voltage consumers 9 and energy storage 7 may utilize the electricity from the low voltage bus 6. Scenario D is the preferred scenario when demand is low, and energy storage 7 may be connected or disconnected from the charger circuit to maintain this voltage.

Referring again to FIG. 2, FIG. 2 Scenario E depicts the connections of the power generator and transmission system when the electrical generator 1 voltage is equal to the high voltage bus 3 voltage, which is the preferred situation to maximize electricity direct current conversion efficiency and net efficiency. The electrical generator 1 will not be in electrical communication with the HDCBU 2 and instead is connected directly to the high voltage bus 3, from which high voltage consumers 8 may draw power. From the high voltage bus 3, electricity is passed through the LDCBU 4 and the voltage is bucked down to that of the low voltage bus 6, after which low voltage consumers 9 or energy storage 7 utilize electricity.

Figure 3:
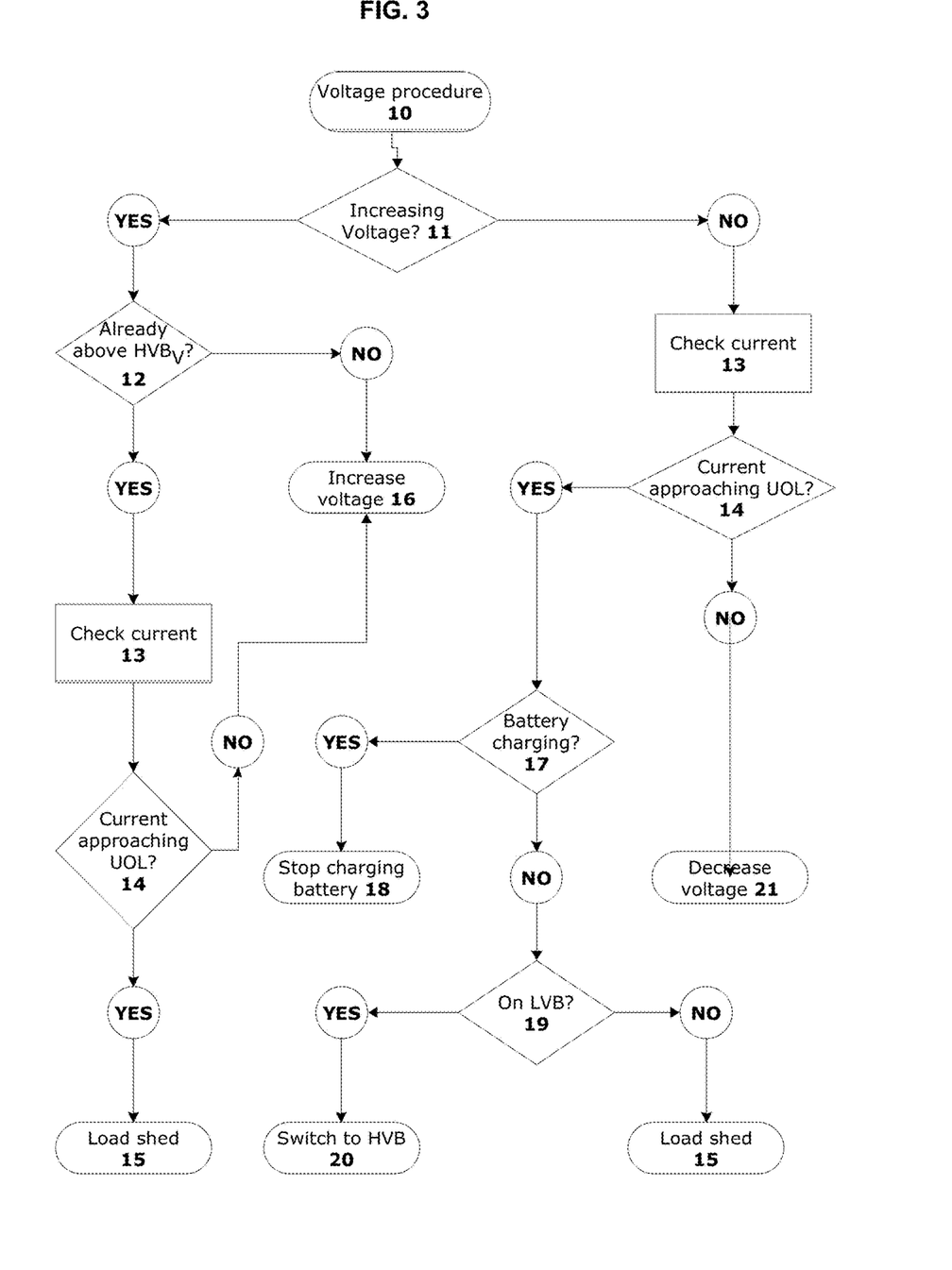
FIG. 3 is a logic flow chart of the electrical generator voltage adjustment procedure in accordance with the present invention.
Figure 4:
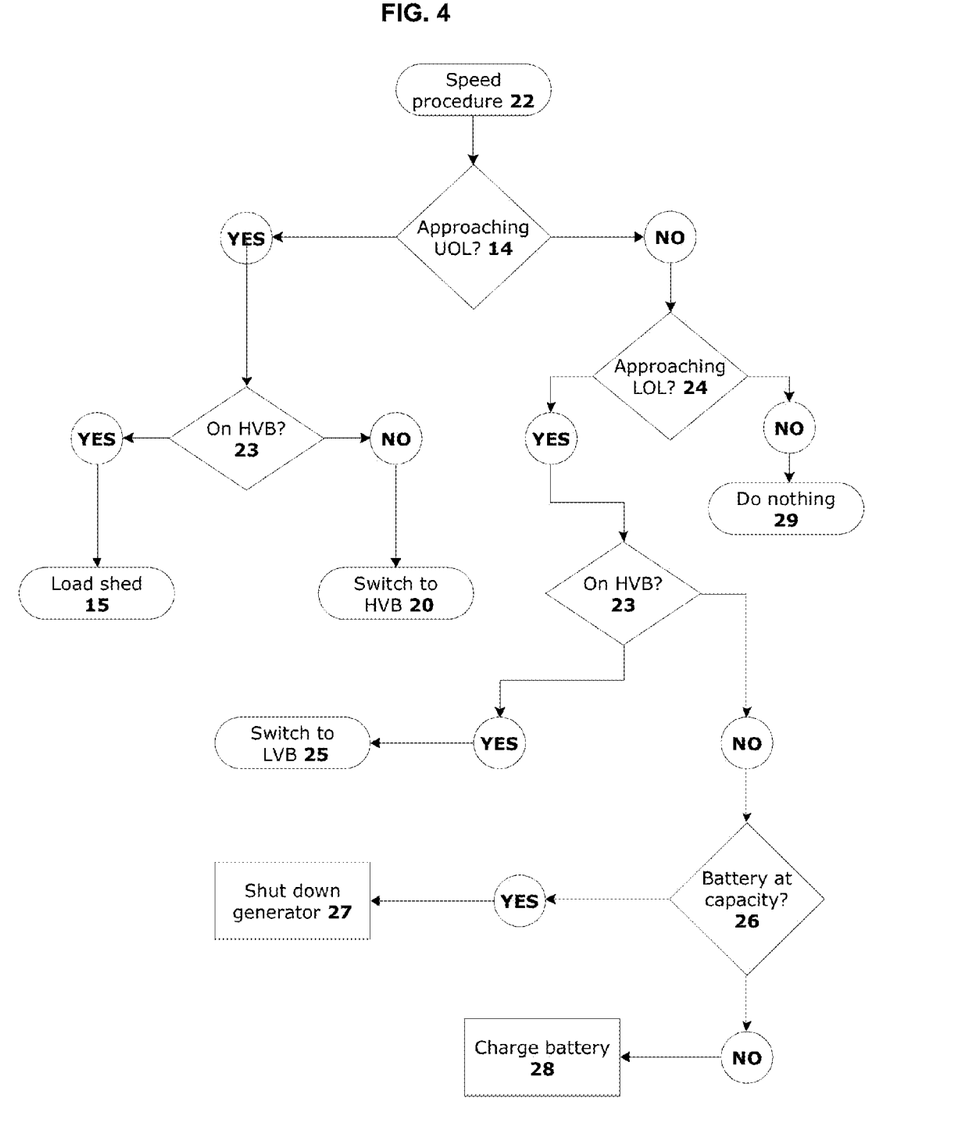
FIG. 4 is a logic flow chart of the electrical generator speed adjustment procedure in accordance with the present invention.

FIGS. 3 and 4 are flowcharts explaining the logic sequence for adjusting the voltage and speed, respectively, to stay within the operating limits. These checks are run continuously to ensure safety. Both figures are explained below:

Turning to FIG. 3, FIG. 3 details the voltage adjustment procedure 10 in order to stay between the minimum and maximum voltage operating ratings. When the voltage is increasing 11, the first check is whether or not the high voltage bus voltage, $HVB_V$, has already been exceeded 12. If not, the voltage can be increased 16 without consequence. When it has been exceeded, the current is checked 13 before the voltage can be increased. This is because the voltage equals the product of current and resistance (V=IR), so if resistance is constant and voltage increases, current must increase proportionally. When the current is not approaching the upper operating limit 14, the voltage is safely increased 16. However, if the current limit is approached, load must be shed 15 to reduce the current.

When the voltage is decreasing, current must always be checked 13. This is because power equals the product of voltage and current (P=IV), so if the power output of the electrical generator 1 does not change and the voltage decreases, the current will correspondingly increase when remaining at the same power output level. If not approaching the upper operating limit 14, the voltage can be decreased 21; if the current is approaching the upper operating limit 14, a check must be performed to determine if the energy storage module 35 (in this figure referred to as the "battery") is charging 17. When the energy storage module 35 is charging, the charger circuit must be disconnected 18 before the voltage can be decreased, so the entire voltage procedure 10 will begin again. When the energy storage module 35 is not charging, the outcome is determined by which voltage bus the generator 1 is outputting to 19. When the low voltage bus 6 is receiving electricity, the voltage switch will switch 20 to the high voltage bus 3. When the high voltage bus 3 is connected, a load shed 15 must occur.

Turning to FIG. 4, FIG. 4 is a flowchart of the checks necessary to adjust the speed 22 of the electrical generator 1. The first is to see if the upper operating limit is being approached 14. If so, the outcome is again determined by which direct current bus is receiving power from the generator 23. If the high voltage bus 3 is connected, load must be shed 15; if the low voltage bus 6 is connected, the voltage switch will switch 20 to the high voltage bus 3. If not near the upper operating limit, a check must be performed whether or not the lower operating limit is being approached 24. If not, speed does not need to be adjusted 29. If the lower operating limit is approached and a check 23 determines that the high voltage bus 3 is receiving power from the electrical generator 1, the voltage switch must change 25 to the low voltage bus 6. If not on the high voltage bus 3, a check must be performed to determine if the energy storage module 35, again referred to as the battery, is at capacity 26. If the module 35 is at capacity, the generator 1 should begin the generator shutdown procedure 27. Otherwise, the module 35 should be connected to the charger circuit and charged 28 to increase demand and necessitate a generator speed increase.

Turning to FIG. 5, FIG. 5 depicts the speed optimization procedure 30. The first check to be performed determines whether or not the projected energy requirement is greater than the total capacity 31 of the energy storage module 35. If so, the generator 1, here referred to as the engine, should be run at the optimum speed 32 in order to charge 28 the energy storage module 35. The first check of whether the projected energy requirement exceeds capacity 31 is then performed again; like the other procedural checks, the speed optimization procedure 30 is cyclical. If at any point the projected energy requirement is less than or equal to the capacity, a check is performed as to whether the projected energy requirement is greater than the actual percentage of capacity 33, or actual stored energy level. If so, the generator 1 is run at optimum speed 32 and the cycle continues as it did if the projected energy requirement exceeded capacity. However, if the projected energy requirement is less than or equal to the actual stored energy level, the generator 1 can be shut down 27.

Turning to FIG. 6, FIG. 6 shows two possible charger circuits, the first with two energy storage cells 36 and the second with six, though any number greater than or equal to two is possible. The arrows at the top of the energy storage module 35 show where it is connected to the rest of the power transmission system depicted in FIGS. 1 and 2. The energy storage management controller 34 is shown as a box at the top with an arrow indicating that it sends signals to the energy storage module 35 and a flywheel 42. The controller can close the switches 37 shown, illustrated as single pole single throw switches, in combinations to produce series, parallel, or combined arrangements which, as known in the art, will vary the voltage of the whole module 35. The dotted line indicates a vacuum boundary, and the connection to vacuum pump 43 via the shaded rectangle shows how the area will be evacuated.

Figure 7:
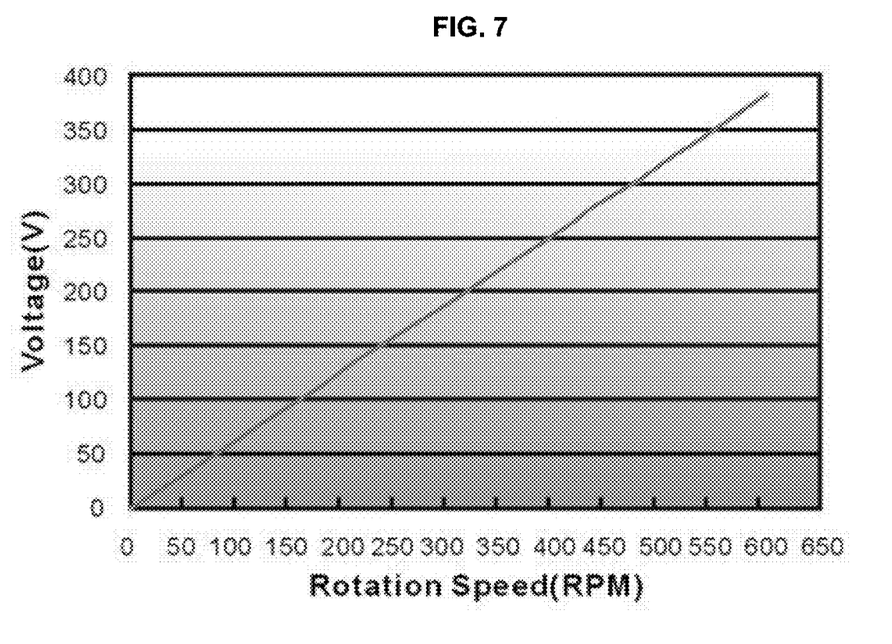
FIG. 7 is a graph showing the positive correlation between increased rotation speed of the electrical generator of other power generator systems and increased voltage output.

Turning to FIG. 7, FIG. 7 shows how currently used systems generate electricity at a voltage dependent upon the generator speed. However, the present invention allows a variable voltage output largely independent of generator speed, allowing the generator 1 to operate at or near the optimum speed to conserve fuel, helping to maximize the total energy to electricity conversion efficiency.

Turning to FIG. 8, FIG. 8 depicts the power generator system and its connections to the power transmission system. The engine management controller 39, the variable voltage flux actuator 40, the fuel regulator 41, the mechanical converter 38, the connecting shaft, the flywheel or flywheels 42, and the electrical generator 1 comprise the power generator system. The mechanical converter 38 and electrical generator 1 are connected via a rotating shaft which transmits power between the two. A flywheel 42 may be connected to the shaft, or one or more flywheels 42 may be connected directly to the electrical generator 1. The engine management controller 39 communicates with the variable voltage flux actuator 40 and the fuel regulator 41, as shown by the connecting lines. The variable voltage flux actuator 40 then communicates with the electrical generator 1, and the fuel regulator 41 communicates with the mechanical converter 38. A vacuum pump 43 is shown connected via a shaded box to a dotted rectangle. The dotted rectangle delineates the area that will be evacuated when the pump is activated, and the shaded box is the connection between the pump and this area. A vacuum buffer tank 45 is also shown that will help accelerate the mechanical power converter 38 as vacuum conditions are created.

Two poles are noted on the electrical generator 1, and arrows going into and out of the poles indicate the direction of current. The HDCBU 2 and the high voltage consumer 8 are meant to illustrate the power transmission system, but in reality the rest of that system will also be connected to the generator 1.

Figure 9:
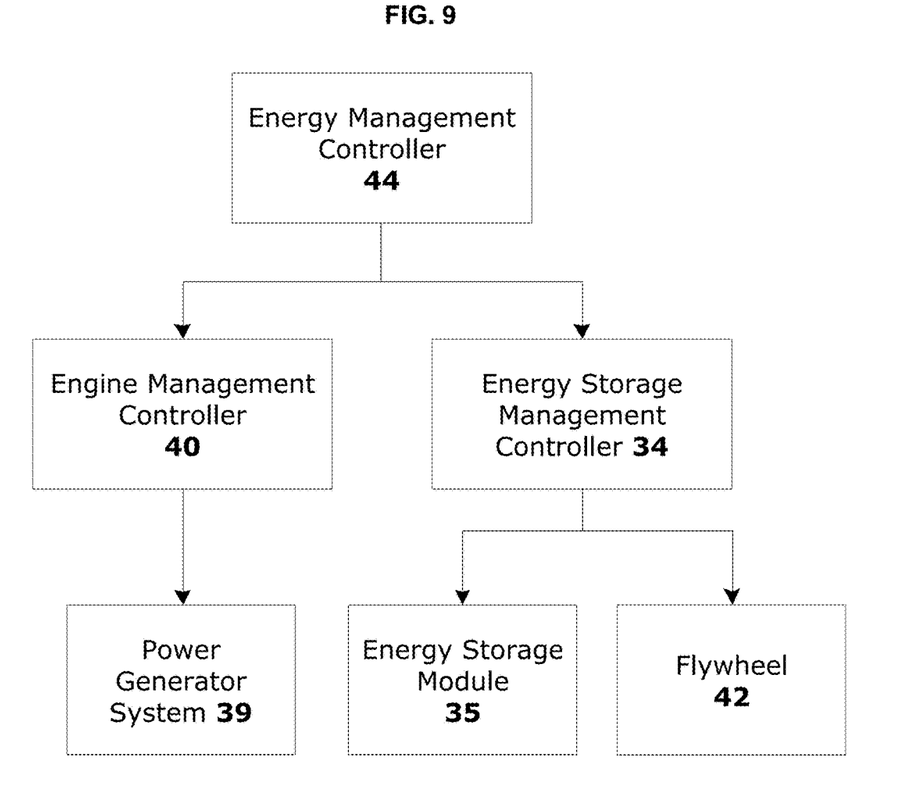
FIG. 9 is a chart showing the hierarchy of controllers and what is controlled by each in accordance with the present invention.

Lastly, turning to FIG. 9, FIG. 9 explains the hierarchy of the various controllers and what each controls. The energy management controller 44 is the top controller and communicates using methods as known in the art with the engine management controller 40 and the energy storage management controller 34. The engine management controller 39 then controls all aspects of the power generator system. The energy storage management controller 34 controls the energy storage module 35 and its configuration as well as the energy storage flywheel 42. It is understood that a wide range of sensors including voltage, current, power, power factor, and temperature are connected to the controllers by methods as known in the art which include analog inputs, digital communication, serial communication, and wireless protocol communications.

What is claimed is:

1. A power generator system comprised of a variable voltage flux actuator controlling an actuator voltage, a fuel regulator controlling a fuel mass flow rate, an engine management controller, a mechanical converter having an actual speed whereby the actual speed is controlled by the combination of adjusting the actuator voltage and the fuel mass flow rate, a maximum speed operating rating and a minimum speed operating rating wherein the mechanical converter is directly connected to an electrical generator having an actual operating current, an actual operating voltage, a maximum current rating and a maximum power production rating and wherein the electrical generator is operable to produce power at an actual electricity production rate through a transmission system, and wherein the engine management controller utilizes the variable voltage flux actuator combined with the fuel regulator to vary both the actual speed and the actual electricity production rate while maintaining the actual speed of the electrical generator to less than the maximum speed operating rating and the actual speed of the electrical generator to greater than the minimum speed operating rating.

2. The power generator system according to claim 1 further comprised of at least two voltage regulators, including a first low voltage regulator having a first low voltage setpoint and at least one low voltage consumer of power transmitted by the transmission system through the first low voltage regulator, and a second high voltage regulator having a second high voltage setpoint and at least one high voltage consumer of power transmitted by the transmission system through the second high voltage regulator, whereby the first low voltage setpoint is at least 50 volts less than the second high voltage setpoint, and comprised of a voltage switch operable to switch electricity from the electrical generator through the voltage flux actuator between the first low voltage regulator and the second high voltage regulator.

3. The power generator system according to claim 2 wherein the electrical generator has a maximum voltage operating rating and a minimum voltage operating rating and wherein the engine management controller and the variable voltage flux actuator is operable to (a) reduce the actual operating voltage when the actual operating voltage is above the second high voltage setpoint by at least one percent, (b) reduce the actual operating voltage when the actual operating voltage is above the first low voltage setpoint by at least one percent and the voltage switch is connected to the first low voltage regulator or to the at least one low voltage consumer, (c) increase the actual operating voltage when the actual operating voltage is below the first low voltage setpoint by at least one percent and the voltage switch is connected to the first low voltage regulator or to the at least one low voltage consumer, (d) increase the actual operating voltage when the actual operating voltage is below the second high voltage setpoint by at least one percent and the voltage switch is connected to the second high voltage regulator or to the at least one high voltage consumer.

4. The power generator system according to claim 2 wherein the electrical generator has a maximum current operating rating and wherein the engine management controller and the variable voltage flux actuator is operable to reduce the actual current when the actual current is above the maximum current operating rating by at least one percent and the voltage switch is connected to the second high voltage regulator or to the at least one high voltage consumer while controlling the fuel regulator and maintaining an actual mechanical converter speed between the minimum speed operating rating and the maximum speed operating rating.

5. The power generator system according to claim 2 whereby the first low voltage regulator produces direct current electricity with a voltage less than 48 volts and the second high voltage regulator produces direct current electricity with a voltage above 100 volts.

6. The power generator system according to claim 2 whereby the first low voltage regulator produces direct current electricity with a voltage less than 60 volts and the second high voltage regulator produces direct current electricity with a voltage above 300 volts and less than 600 volts.

7. The power generator system according to claim 2 further comprised of a connected energy storage module having a charger circuit operable to store energy, wherein the speed of the mechanical converter is maintained whereby the actual speed is controlled by the combination of adjusting the actuator voltage and the fuel mass flow rate and by at least approximately one percent above the minimum speed operating rating, and wherein the engine management controller activates the charger circuit to charge the connected energy storage module with an increase of the actual electricity production rate.

8. The power generator system according to claim 1 further comprised of a speed regulator operable to control the speed of the mechanical converter to less than the maximum speed operating rating and greater than the minimum speed operating rating, and whereby the electrical generator is further operable as an electric motor to rotate the mechanical converter when the actual electricity production rate is at least approximately one percent less than the minimum speed operating rating.

9. The power generator system according to claim 8 further comprised of an integral flywheel operable to store energy and to maintain the speed of the mechanical converter above the minimum speed operating rating by at least approximately one percent, whereby the integral flywheel increases an operating time above the minimum speed operating rating by at least approximately five seconds longer than an operating time above the minimum speed operating rating without the integral flywheel.

10. The power generator system according to claim 1 further comprised of an energy storage module having an energy storage management controller, at least two energy storage cells with each cell having an actual operating voltage, and at least one switch operable to vary the configuration of the at least two energy storage cells into a string of at least a subset of the at least two energy storage cells in at least one of series, parallel or a combination arrangement, wherein the energy storage management controller is operable to to vary the configuration of the at least two energy storage cells into the string of at least a subset of the at least two energy storage cells in the at least one of series, parallel or a combination arrangement to within at least approximately five percent of an actual electrical generator operating voltage while controlling the fuel regulator and maintaining an actual mechanical converter speed between the minimum speed operating rating and the maximum speed operating rating, and an actual current of at least approximately one percent less than the maximum current rating.

11. A power generator system comprised of a fuel regulator controlling a fuel mass flow rate, an engine management controller, a mechanical converter having an actual speed, a maximum speed operating rating and a minimum speed operating rating wherein the mechanical converter is directly connected to an electrical generator having an actual operating current, an actual operating voltage, a maximum current rating and a maximum power production rating and wherein the electrical generator is operable to produce electricity at an actual electricity production rate, wherein the electrical generator actual voltage and fuel mass flow rate combines to control the mechanical converter actual speed and is operable to produce the electricity at an output voltage that varies at least approximately five percent of a maximum voltage rating, wherein the electricity produced is rectified and then regulated to a specified direct current voltage lower than the maximum voltage rating by at least approximately five percent and the electricity produced is provided to a direct current bus having an actual bus operating voltage and a bus voltage setpoint, wherein the electricity produced is provided to the direct current bus within at least approximately five percent of the bus voltage setpoint while controlling the fuel regulator and maintaining an actual mechanical converter speed operable to maximize a net energy efficiency from mechanical converter efficiency and electricity direct current conversion efficiency to the electrical bus.

12. The power generator system according to claim 11 further comprised of an energy storage module whereby the energy storage module has a maximum operating current of at least approximately twenty percent greater than the maximum operating current of the electrical generator.

13. The power generator system according to claim 12 wherein the energy storage module has a charge voltage and a discharge voltage, wherein the energy storage module is operable with a variance of at least approximately ten percent between the charge voltage and the discharge voltage.

14. The power generator system according to claim 12 wherein the energy storage module is further comprised of an energy storage management controller and a charger circuit, at least two energy storage cells with each cell having an actual operating voltage and an optimal voltage, and an at least one switch operable to vary the configuration of the at least two energy storage cells into a string of at least a subset of the at least two energy storage cells in at least one of series, parallel or a combination arrangement, wherein the energy storage management controller is operable to vary the at least one switch so the voltage of the at least two energy storage cells are within at least approximately five percent of an actual electrical generator operating voltage.

15. The power generator system according to claim 11 further comprised of a variable voltage flux actuator wherein the engine management controller utilizes the variable voltage flux actuator combined with the fuel regulator to vary the actual electricity production rate while maintaining the actual speed of the electrical generator to less than the maximum speed operating rating and the actual speed of the electrical generator to greater than the minimum speed operating rating.

16. A power generator system comprised of an energy storage module having an energy storage management controller and a charger circuit, at least two energy storage cells with each cell having an actual operating voltage and an optimal voltage, and at least one switch operable to vary the configuration of the at least two energy storage cells into a string of at least a subset of the at least two energy storage cells arranged in at least one of series, parallel or a combination arrangement, wherein the energy storage management controller is operable to arrange the at least two energy storage cells to be within at least approximately five percent of an actual electrical generator operating voltage, further comprised of a fuel regulator, an engine management controller, a mechanical converter having an actual speed, a maximum speed operating rating, a minimum speed operating rating, and an optimal speed operating rating being a nonlinear function of the actual operating speed whereby the optimal speed operating rating has a global maximum efficiency point, further comprised of an electrical generator directly connected to the mechanical converter having an actual operating current, an actual operating voltage, a maximum current rating and a maximum power production rating and wherein the electrical generator is operable to produce electricity at an actual electricity production rate, and wherein the energy storage management controller varies the at least two energy storage cells arrangement to charge the energy storage module at an actual operating current and an actual operating voltage concurrently with the engine management controller varying the actual speed of the electrical generator to at least within five percent of the optimal operating speed while controlling a fuel regulator controlling a fuel mass flow rate and maintaining an actual mechanical converter speed whereby the actual speed is controlled by the combination of adjusting the electrical generator actual operating voltage and the fuel mass flow rate between the minimum speed operating rating and the maximum speed operating rating, and an actual current of at least approximately one percent less than the maximum current rating.

17. The power generator system according to claim 16 further comprised of a variable voltage flux actuator operable having an actual voltage to match at least within approximately five percent of the optimal voltage of the energy storage module.

18. The power generator system according to claim 17, whereby the variable voltage flux actuator actual voltage combined with the fuel regulator fuel mass flow rate varies the mechanical converters actual speed and actual electricity production rate to maintain the actual speed of the electrical generator to less than the maximum speed operating rating and the actual speed of the electrical generator to greater than the minimum speed operating rating.

19. The power generator system according to claim 16, further comprised of a variable voltage flux actuator and an anti-cycling timer having a next time cycle off allowed parameter, whereby the engine management controller and the energy storage management controller are operable to calculate a projected power consumption within the next time cycle off allowed parameter, whereby the engine management controller calculates an operating time requirement to charge the energy storage module to an actual stored energy level exceeding the projected power consumption within the next time cycle off allowed parameter, and whereby the variable voltage flux actuator combined with the fuel regulator varies the actual electricity production rate to operate at the global maximum efficiency point for the operating time requirement.

20. The power generator system according to claim 19 wherein the power generator system is utilized in a hybrid vehicle having a current location and a destination, whereby the engine management controller limits the energy stored level to enable a full recovery of energy from regenerative braking.

21. The power generator system according to claim 19 wherein the power generator system is utilized in a hybrid vehicle having a current location and a destination, whereby the engine management controller calculates the energy stored level to reach the destination without a deep discharge cycle of the energy storage module.

* * * * *